United States Patent [19]
Su

[11] Patent Number: 5,019,908
[45] Date of Patent: May 28, 1991

[54] APPARATUS AND METHOD FOR REDUCING FLICKERING IN A STILL VIDEO FRAME IN A DIGITAL IMAGE PROCESSING SYSTEM

[75] Inventor: Jung-Hoon Su, Seoul, Rep. of Korea

[73] Assignee: SamSung Electronics Co., Ltd., Suwon, Rep. of Korea

[21] Appl. No.: 319,691

[22] Filed: Mar. 7, 1989

[30] Foreign Application Priority Data

Mar. 8, 1988 [KR] Rep. of Korea .................. 1988-2383

[51] Int. Cl.$^5$ ..................... H04N 5/208; H04N 5/213
[52] U.S. Cl. ..................... 358/166; 358/167
[58] Field of Search ............... 358/160, 166, 167, 149, 358/312, 313, 336, 340; 360/10.1, 11.1, 35.1

[56] References Cited

U.S. PATENT DOCUMENTS

| | | | |
|---|---|---|---|
| 3,534,170 | 10/1970 | Davies | 358/149 |
| 4,477,843 | 10/1984 | Kinjo et al. | 358/342 |
| 4,679,084 | 7/1987 | Topper et al. | 358/160 |
| 4,698,675 | 10/1987 | Casey | 358/160 |
| 4,755,879 | 7/1988 | Hinson | 358/149 |
| 4,761,686 | 8/1988 | Willis | 358/160 |
| 4,783,703 | 11/1988 | Murakoshi et al. | 358/336 |
| 4,816,929 | 3/1989 | Bradley et al. | 358/312 |
| 4,876,734 | 10/1989 | Kawamura | 358/167 |

Primary Examiner—Tommy P. Chin
Attorney, Agent, or Firm—Robert E. Bushnell

[57] ABSTRACT

In a digital image processing system, an A/D converter digitizes an input analog 2-field (i.e. 525 lines NTSC) video signal into first and second digital video field data components of a digital video frame, and the data of the first and second fields is stored in an image memory. Under control command, the first digital video field data is read-out of the image memory, switched to a data output and D/A converted into a first analog video field for supplying the first field component of an analog video still frame, and simultaneously the first digital video field data is also stored in a field memory. The second digital video field data is then read-out of the image memory into one input of an adder while the first digital video field data is read-out of the field memory into another input of the adder, whereby the first and second digital field data is digitally summed, then passed through a divider to provide the digital average of the data of the first and second digital video fields. The averaged digital video field data is then switched to the data output and D/A converted for supplying the second field component of a 2-field analog video still/freeze frame. Flicker due to relative motion occurring between the two fields of the input analog video frame is reduced by one-half in the output analog video frame due to the digitally performed averaging operation, providing an improved still/freeze frame video picture.

3 Claims, 2 Drawing Sheets

APPARATUS AND METHOD FOR REDUCING FLICKERING IN A STILL VIDEO FRAME IN A DIGITAL IMAGE PROCESSING SYSTEM

TECHNICAL FIELD

This invention relates to an apparatus and method for producing a still frame in a digital image system, and more particularly, to an apparatus and method for eliminating a flicker phenomenon in still video frame.

BACKGROUND ART

As for the digital image system, that is a system which can convert analog image signals into digital image signals so that the digital image signals can be stored in an image memory, and which, if necessary, can reproduce it, such as digital VTR, image filing system, digital television and the like.

Generally the frames reproduced through the television system are successively scanned 30 times per second and one frame is scanned by dividing into two field scannings, thereby causing an effect which appears as if 60 frames are scanned. That is, in case of the television system in Korea, one frame consists of 525 scanning horizontal lines, of which odd horizontal scanning lines and even horizontal scanning lines are separated from each other, each of which is called one field, and one frame is completed by both fields to be scanned separately, one by one.

The interlaced scanning method as described above is also employed in a video camera producing the image signal. Therefore, the image signals consisting of one frame are not associated with the transient images, but the image signals corresponding to each one of the scanning lines are associated with the images having a time interval therebetween each other. Accordingly, the image signals constituting one frame do not constitute simultaneous instant pictures such as photographs but constitute continuously changing. Therefore, if one frame of scenes, in which the object to be pictured is moving, is repeatedly seen, it is found that the flicker phenomenon, in which the frame fluctuates or flickers, is caused by the time difference in one still picture frame constituted by two fields.

FIG. 1 is a block diagram showing a conventional digital image processing system, in which an A/D converter 2 receives analog video signals to converted into digital signals at a predetermined sampling frequency from a controller 1. Then, controller 1 applies the address signals and the write control signals to an image memory 3 to store the digital signals in image memory 3, and in case of reproduction of them applies the read control signals and the address signals thereto. Since in image memory 3 one frame or one field of picture data is stored, upon reproduction of the still picture frame the stored picture data are reproduced as analog videp signal through a D/A converter 4 by the read control of controller means 1.

Therefore, the conventional system has problems in which, upon reproduction of the still picture frame, if one field of picture data is stored in image memory 3, then the number of horizontal scanning lines constituting the picture frame is reduced by half so that the picture frame is rough and its quality deteriorates by repeatedly reproducing a picture frame with only one field (odd or even horizontal scanning lines), and if one frame of picture data is stored in image memory 3, then the flicker phenomenon in which the picture frame fluctuates or flickers, is caused by the time difference between two fields constituting one picture frame as described above.

SUMMARY OF THE INVENTION

It is accordingly an object of the present invention to provide an apparatus and a method capable of eliminating a flicker phenomenon upon reproduction of the still picture frame by obtaining and outputting the average values of the picture data of the fist field and second field after outputting the picture data of the first field of one frame's picture data upon reproduction of the still picture frame.

The foregoing and other objects and of the invention will be better understood from the following more detailed description and appended claims.

DESCRIPTION OF THE PREFERRED EMBODIMENTS

The present invention will now be described hereinbelow with reference to the drawings.

Figure 1:
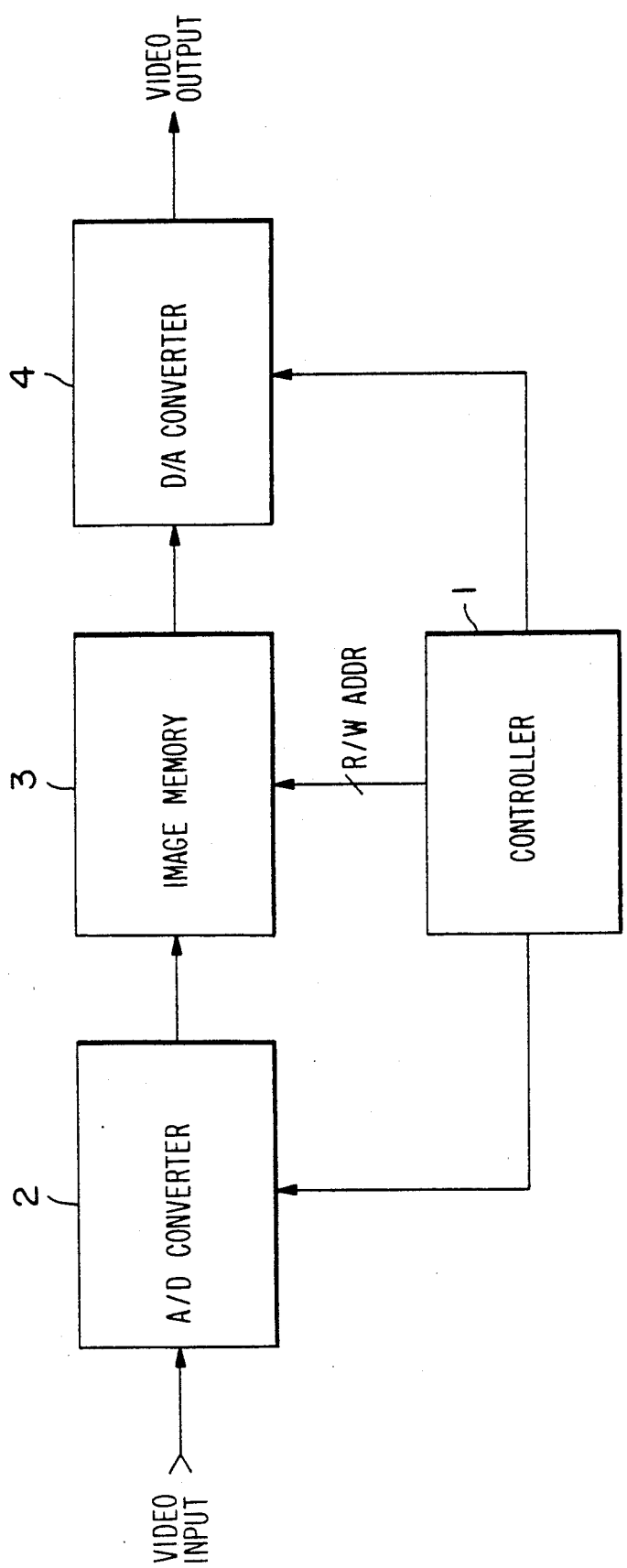
FIG. 1 is a block diagram showing a conventional digital image processing system.
Figure 2:
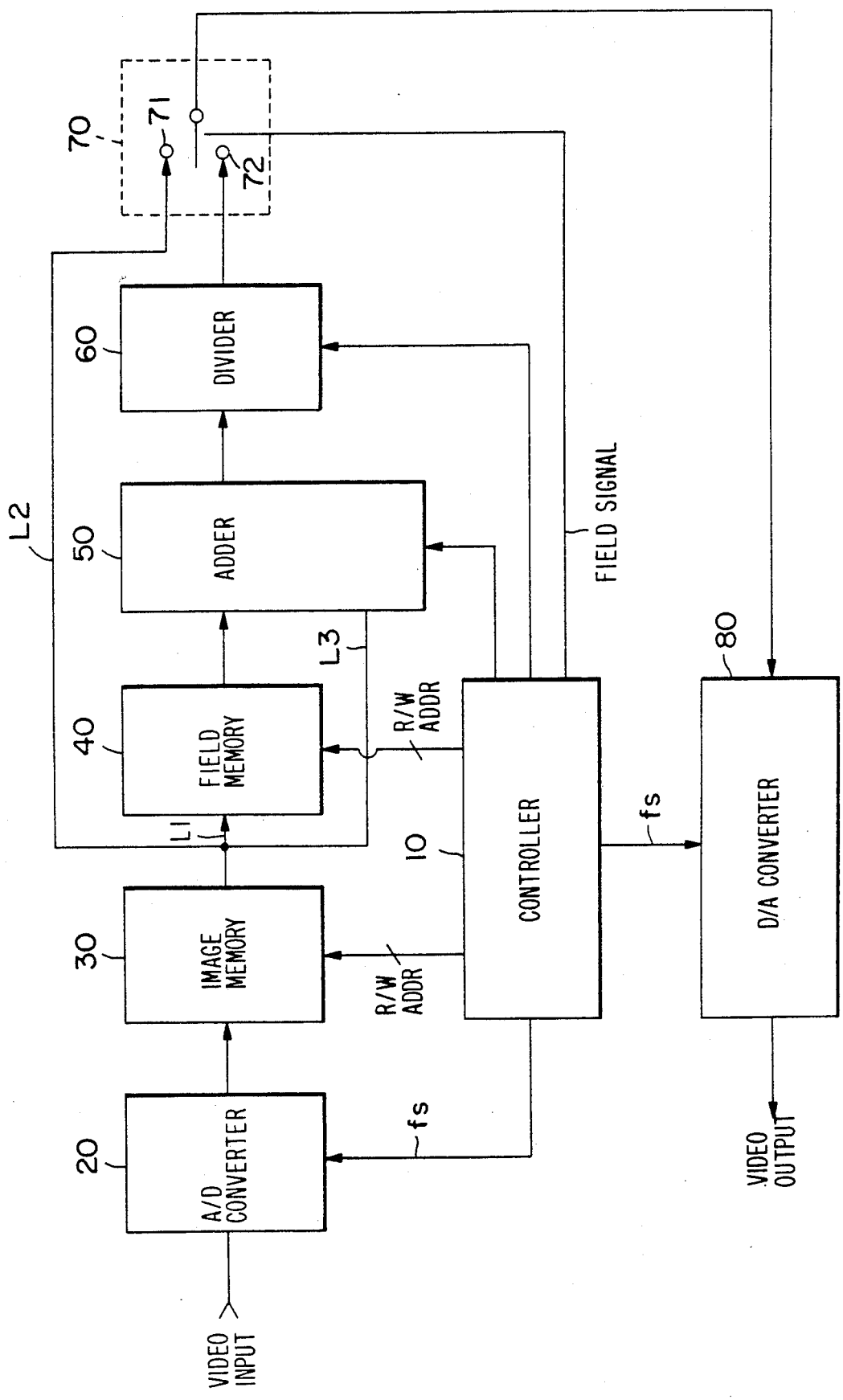
FIG. 2 is a block diagram showing a digital image processing system according to the present invention.

FIG. 2 is a block diagram showing schematically an apparatus for eliminating the flicker phenomenon upon reproduction of the still picture frame according to the present invention, which includes a controller means 10 for controlling and processing the system, an A/D converter 20 for converting analog video signals into digital video signals at the sampling frequency, an image memory 30 for storing one frame of picture data of digital video signals, a field memory 40 for storing the first field's picture data of one frame's picture data from image memory 30 under control of controller 10, an adder 50 for adding the first field's picture data from field memory 40 to the present second field's picture data output from image memory 30 under control of controller 10, a divider 60 for dividing the picture data from adder 50 by two under control of controller 10, a selector 70 for selecting the first field's picture data from image memory 30 in the first field period and the output from divider 60 in the second field period, and a D/A converter 80 for converting the output from selector 70 into the analog video signals at the sampling frequency.

An embodiment of the present invention will be explained according to the above-mentioned construction.

A/D converter 20 upon receiving the analog video signal, converts it into the digital video data at the predetermined sampling frequency, and the first and second field's picture data constituting one picture frame are stored into image memory 30 frame by frame according to the address signal and the write control signal from controller 10.

The data stored in image memory 30 are output again by the address signal and the read control signal from controller 10 to be converted into the analog video signals through the D/A converter 80, so that the converted signals are output to a television, monitor or VTR.

In an digital image recording apparatus such as a image filing system, an apparatus for recording the digital image data on the recording medium such as tapes and an apparatus for reproducing the recorded data are added.

In the digital image processing system as described above, the process is as described hereinbelow.

Firstly, the controller 10, when the first field signal is output from said image memory 30, causes selector 70 to switch to a terminal 71 during one field period so that the first field data is output through a second path L2, and outputs the address and the write control signals to the field memory 40 so that the first field data through a first path L1 is stored in the field memory 40.

After the first field data is output, in order to sequentially outout the second field data, controller 10 causes the second field data output through a third field path L3 to be applied to the adder 50 and simultaneously therewith reads the first field data stored in field memory 40 to apply it to the adder 50.

At this time, in the selector 70 a terminal 72 is selected during the second field data output period by controller 10, and in adder 50 the first field data and the second field data are added by units of word (the quantizing bit number).

The output from adder 50 is applied to the divider 60 by control of the controller 10, and then the picture data into which two field data are added is divided by two so that the average value of two field data is obtained. Thereafter, the obtained average value is applied to the selector 70.

The first field data and the average value data (the average value of the first and second field data) are selectively output through the D/A converter 80 to a television or monitor.

Accordingly, upon reproduction of the still picture frame, one frame is constituted by two field halves of digital image signals, of which the former one half (the first field) is converted into the analog signal as it is, and the latter one half (second field) is averaged with the former field (the first field) signal and thereafter is converted into the analog signal to be output. Therefore, although the frame scanning is performed in which two field signals are scanned by interlaced scanning to thereby reproduce one complete frame, the fluctuation or flickering phenomenon in the frame can be reduced by half, and the deterioration and the roughness in quality of frame due to the field scanning can be prevented.

As described above, the digital image processing system according to the present invention has advantage in which upon reproduction of the still picture frame, by performing the frame scanning, fluctuation or flickering phenomenon in the frame can be reduced by half so that the still picture frame having the fine and high picture quality can be reproduced.

While there has been shown and described what is considered to be preferred embodiments of the present invention, it will be apparent to those skilled in the art that various changes and modifications may be made therein without departing from the invention as defined in the appended claims.

What is claimed is:

1. An apparatus for reducing flickering in a video still frame produced from first and second video fields in a digital image processing system, comprising:

analog-to-digital (A/D) converter means for converting an input analog video signal into digital video data at a predetermined sampling frequency, said A/D converter means receiving as its input analog video signal first and second analog video field signal constituents of input analog video frames in succession and converting same respectively into corresponding first digital video field data and second digital video field data constituents of corresponding digital video frames;

image memory means having a data input operably coupled with a data output of said A/D converter means, said image memory also having a read-write address (R/W ADDR) control terminal, for storing and outputting data of successive first and second digital video fields of corresponding digital video frames under control of said R/W ADDR control terminal;

field memory means having a data input operably connected via a first data path (L1) with a data output of said image memory means and also having a R/W ADDR control terminal, for storing and outputting data of a first digital video field of a digital video frame under control of said R/W ADDR control terminal of said field memory means;

adder means having a first adder input operably connected via a secnd data path (L3) with a data output of said image memory means for receiving data of a second digital video field of a digital video frame output therefrom, and a second adder input operably connected with a data output of said field memory means for receiving data of said first digital video field of said digital video frame therefrom, said adder means furrther having a control terminal, for adding said data of said first digital video field data with said data of said second digital video field to produce the sum thereof;

divider means operably connected with a data output of said adder representing said sum means and also having a control terminal, for dividing the added data of said first and second digital video fields output from said adder means by two to produce an averaged data of said first digital video field data and said second digital video field data therefrom;

selector means having a first data input operably connected via a third data path (L2) with a data output of said image memory means for receiving said first digital video field data output therefrom, a second data input operably connected with a data output of said divider means for receiving said averaged data of said first and second digital video field data output therefrom, and also having a data output and a control terminal, for successively coupling said first digital video data appearing on said first data input and said averaged data of said first and second digital video fields appearing on said second data input thereof to said data output thereof under control of said control terminal thereof;

digital-to-analog (D/A) converter means operably connected with the data output of said selector means, for converting, at said predetermined sampling frequency, said successively output first digital video field data and said averaged data of said first and second digital video fields into respective first and second analog video field signal constituents of an analog video frame signal output; and controller means operably connected with said respective R/W ADDR control terminals of said image memory means and said field memory means and with said respective control terminals of said adder means, said divider means and said selector means, firstly, for addressing said image memory means for causing said image memory means to store data of each first and second digital video field of each digital video frame and for causing said image memory means to read-out data of each said first digital video field of each said digital video frame to said data input of said field memory means via said first data path (L1) and at the same time to said first data input of said selector means via said third data path (L2) and, at the same time, for addressing said field memory means for causing said field memory means to store said data of said first digital video field read-out from said image memory means, and, at the same time, for causing said selector means to couple said read-out first digital video field data from said image memory means via said third data path (L2) and said first data input and data output of said selector means for supplying data of a first digital video field of a digital video still frame to said D/A converter means;

secondly, for addressing said image memory means to read-out said stored data of said second digital video field via said second path (L3) to said first data input of said adder means, and for addressing said field memory means for causing said field memory means to read-out said stored data of said first digital video field to said second data input of said adder means;

thirdly, for causing said adder means to add said data of said first and second digital video fields input thereto for producing the sum thereof; and fourthly, for causing said divider means to divide said sum of said data of said first and second digital video fields by two for producing the averaged data thereof, and, at the same time, for causing said selector means to couple said averaged data of said first and second digital video fields via its second data input and data output for supplying data of a second digital video field of a digital video still frame to said D/A converter means.

2. A method for reducing flickering in a video still frame produced from first and second video fields in a digital image processing system, comprising;

converting an input analog video signal comprising first and second analog video field signal constituents of input analog video frames in succession respectively into corresponding first digital video field data and second digital video field data constituents of corresponding digital video frames;

storing data of said first and second digital video fields of a digital video frame in an image memory;

reading-out said stored data of said first digital video field of said digital video frame from said image memory;

converting said read-out data of said first digital video field of said digital video frame into a first analog video field signal constituent of an analog still video frame;

storing said read-out data of said first digital video field in field memory;

reading-out said stored data of said first digital video field from said field memory;

reading-out said stored data of said second digital video field from said image memory;

adding said read-out data of said first digital video field from said field memory and said read-out data of said second digital video field from said image memory, for producing the digital sum thereof;

dividing the sum of said data of said first digital video field and said data of said second digital video field by two, for producing the digital average thereof; and converting the digital average of said soft data of said first and second digital video fields into a second analog video field signal constituent of an analog still video frame.

3. An apparatus for reducing flickering in a video still frame produced from first and second video fields in a digital image processing system, comprising:

image memory means having a read-write address (R/W ADDR) control terminal, for storing and outputting data of successive first and second digital video fields of corresponding digital video frames under control of said R/W ADDR control terminal;

field memory means having a data input operably connected via a first data path (L1) with a data output of said image memory means and also having a R/W ADDR control terminal, for storing and outputting data of a first digital video field of a digital video frame under control of said R/W ADDR control terminal of said field memory means;

adder means having a first adder input operably connected via a second data path (L3) with a data output of said image memory means for receiving data of a second digital video field of a digital video frame output therefrom, and a second adder input operably connected with a data output of said field memory means for receiving data of said first digital video field of said digital video frame therefrom, said adder means further having a control terminal, for adding said data of said first digital video field data with said data of said second digital video field to produce the sum thereof;

divider means operably connected with a data output of said adder means and also having a control terminal, for dividing the added data representing said sum of said first and second digital video fields output from said adder means by two to produce an averaged data of said first digital video field data and said second digital video field data therefrom;

selector means having a first data input operably connected via a third data path (L2) with a data output of said image memory means for receiving said first digital video filed data output therefrom, a second data input operably connected with a data output of said divider means for receiving said averaged data of said first and second digital video field data output therefrom, and also having a data output and a control terminal, for successively coupling said first digital video data appearing on said first data input and said averaged data of said first and second digital video fields appearing on said second data input thereof to said data output thereof under control of said control terminal thereof; and controller means operably connected with said respective R/W ADDR control terminals of said image memory means and said field memory means and with said respective control terminals of said adder means, said divider means and said selector means, firstly, for addressing said image memory means for causing said image memory means to store data of each first and second digital video field of each digital video frame and for causing said image memory means to read-out data of each said first digital video field of each said digital video frame to said data input of said field memory means via said first data path (L1) and at the same time to said first data input of said selector means via said third data path (L2) and, at the same time, for addressing said field memory means for causing said field memory means to store said data of said first digital video field read-out from said image memory means, and, at the same time, for causing said selector means to couple said read-out first digital video field data from said image memory means via said third data path (L2) and said first data input and data output of said selector means for supplying a data output of a first digital video field of a digital video still frame;

secondly, for addressing said image memory means to read-out said stored data of said second digital video field via said second data path (L3) to said first data input of said adder means, and for addressing said field memory means for causing said field memory means to read-out said stored data of said first digital video field to said second data input of said adder means;

thirdly, for causing said adder means to add said data of said first and second digital video fields input thereto for producing said sum thereof; and fourthly, for causing said divider means to divide said sum of said data of said first and second digital video fields by two for producing said averaged data thereof, and, at the same time, for causing said selector means to couple said averaged data of said first and second digital video fields via its second data input and data output for supplying a data output of a second digital video field of a digital video still frame.

* * * * *

UNITED STATES PATENT AND TRADEMARK OFFICE
CERTIFICATE OF CORRECTION

PATENT NO. : 5,019,908
DATED : 28 May 1991
INVENTOR(S) : Jung- Hoon Su

It is certified that error appears in the above-indentified patent and that said Letters Patent is hereby corrected as shown below:

Column 1, Line 10     after "in" insert --a--;

Column 2, Line 36     Before "digital" insert --the--;

Line 53     after "20" insert --,--;

Column 3, Line 6     before "image" delete "said":

Signed and Sealed this

Nineteenth Day of November, 1996

*Attest:*

BRUCE LEHMAN

*Attesting Officer*     *Commissioner of Patents and Trademarks*